United States Patent Office 3,540,921
Patented Nov. 17, 1970

3,540,921
ORIENTED THERMOPLASTIC FILMS COATING WITH A COMPOSITION OF A HEAT-SEALABLE POLYMER AND A METAL OR AMMONIUM SALT
Peter Manners Ward, Wheathampstead, and John Clifford Wilson, Bushey, England, assignors to Imperial Chemical Industries Limited, London, England, a corporation of Great Britain
No Drawing. Continuation of application Ser. No. 451,307, Apr. 27, 1965. This application Mar. 21, 1969, Ser. No. 816,147
Claims priority, application Great Britain, May 5, 1964, 18,638/64
Int. Cl. C09j 7/02; B32b 27/08, 27/18
U.S. Cl. 117—122        19 Claims

ABSTRACT OF THE DISCLOSURE

There is provided a heat-sealable anti-static oriented thermoplastic film and process for producing the same. The film is coated with an aqueous dispersion of a heat-sealable polymer and 0.05% to a 5% of a salt of ammonium or a metal of Groups I, II, II-A, III-A and the transition metals of the Periodic Table. The salt must be stable at temperatures above 50° C. and have a solubility in water of at least 25% by weight. The salt may suitably be a halide of ammonium, sodium, lithium and calcium or a sulfate or nitrate nickel and aluminum. Optionally, up to 0.5% of an ionic surfactant may be in the composition.

---

This application is a continuation of application Ser. No. 451,307, filed Apr. 27, 1965, and now abandoned.

This invention relates to coated films, and more particularly to synthetic organic thermoplastic films having a heat-sealable coating and a process for the production of heat-sealable coated films.

It is known that when such films are coated with layers of suitably chosen material in order to render them heat sealable, such as layers of vinylidene chloride copolymers, they have such a high tendency to pick up electrostatic charges that they are unsuitable for use on many types of automatic packaging machinery. It is therefore desirable to include in the heat-sealable layer a substance imparting antistatic properties to the coated film.

Unfortunately, the substances which are normally used to impart antistatic properties to films are surface-active agents, and when many of the common surface active agents are included in a heat-sealable coating composition applied to films of polyolefines, particularly polypropylene films, in amounts sufficient to impart worthwhile improvements in antistatic properties, only very poor adhesion to the base film is obtained unless the film is first coated with an anchor coat of, for instance, a substantially water-insoluble thermosetting resin. It is both costly and inconvenient to have to use such an anchor coat.

It is an object of the present invention to provide a process for coating thermoplastic films with heat-sealable layers having good antistatic properties without the necessity of employing an anchor coat. It is another object of this invention to provide improved coated films.

Accordingly, we provide a process which comprises coating the surface of a synthetic organic thermoplastic film with an aqueous dispersion of a heat-sealable polymer, said dispersion containing from 0% to 0.5% by weight of its polymer solids content of an ionic surface-active agent and from 0.05% to 5% by weight of the water present of an ammonium or metal salt which is stable at temperatures above 50° C., preferably at temperatures up to 140° C., and which is soluble in water at 20° C. to an extent of at least 25% by weight, and thereafter drying the coated film, to deposit a continuous layer of the heat-sealable coating on said film.

Our invention also comprises the resulting coated films.

It is preferred that the said dispersion contains no ionic surface-active agent in order that any tendency for it to coagulate caused by the presence of one of the said salts is as low as possible. However, the presence of very small amounts, up to 0.5%, of ionic surface-active agents which may have been used in the manufacture of the polymer dispersion can in some cases be tolerated. For example, it may be desirable to manufacture the heat-sealable polymer dispersion by a dispersion polymerisation process using such small amounts of cationic surface-active agents or anionic surface-active agents such as the alkali metal salts of sulphated or sulphonated long chain alcohols.

Preferred salts having the prescribed properties for use in the above process, because of the excellent antistatic properties which they impart, are those which are capable of existing in the form of a hydrate, especially ammonium halides, halides of the metals classified in Groups I and II and as Transition Elements in the Periodic Table, and nitrates and sulphates of metals classified in Groups II–A and III–A of the Periodic Table. Especially useful are such salts of the metals of low atomic weight in the above-mentioned Groups, and the Transition Elements of the first series of the Periodic Table.

Specific examples of such salts are ammonium iodide, lithium iodide, sodium iodide, potassium iodide, lithium bromide, lithium chloride, magnesium iodide, magnesium chloride, calcium chloride, zinc chloride, chromic chloride, sodium fluoride, potassium fluoride, magnesium nitrate, nickel nitrate, cobalt nitrate, aluminum sulphate and manganese sulphate. Halides of Group II–A metals give excellent results.

It is preferred that the said salts are used in an amount of at least 1% by weight of the water, but less than 3%, as greater amounts tend to produce coated films having an unduly high degree of haze.

If desired, the wetting characteristics of the said dispersions may be improved by the inclusion therein of a small quantity of a non-ionic surface-active agent, for instance up to 2% by weight based on the weight of the polymer solids.

It is preferred to add any non-ionic surface-active agent used in our process to the polymer dispersion rather than before its manufacture by polymerization.

As examples of suitable non-ionic surface-active agents that may be used we cite the condensation products of ethylene oxide with fatty acids, or with fatty acid amides, ethylene oxide/propylene oxide copolymers, polyoxyethylated nonyl phenol, polyoxyethylated octyl cresol, polyoxyethylated alkyl alcohols such as the oleyl and cetyl alcohols and hydrolysed polyvinyl acetate. Particularly suitable quantities of non-ionic surface-active agent for use in our invention are from 0.4–1.5% by weight based on the weight of the polymer solids.

When our process is used to coat films of polyolefines such as polypropylene, it is normally necessary first to activate the film surface by any of the known methods for improving the adhesion of coatings thereto, for instance to subject it to corona discharge treatment, or to treatment with ozone or chemical oxidising agents such as halogens, potassium permanganate and chromic acid.

Of these treatments the corona discharge treatment, by for instance the process of British specification No. 715,914, is preferred because of its effectiveness and because it is a dry process and is readily carried out.

As the heat-sealable coating polymer there may be used any polymer, including copolymer, which can be heat sealed on the film to which it is applied by standard heat sealing equipment (see H. P. Zade, "Heat Sealing and High Frequency Welding of Plastics" Temple Press, London, 1959).

Because they give hard coatings and high heat seal strengths and because of their resistance to moisture and low gas permeability, the heat-sealable coatings which are preferred are the copolymers of vinylidene chloride in major amount, with another mono-ethylenically unsaturated compound copolymerisable therewith such as methyl acrylate, ethyl acrylate, methyl methacrylate, methacrylamide, methyl vinyl ether, ethyl vinyl ether, methyl vinyl ketone and acrylonitrile, for instance copolymers containing between 80% and 95% by weight of vinylidene chloride and up to 20% of acrylonitrile. It is particularly preferred to use terpolymer of vinylidene chloride with such copolymerisable monomers and additionally a small proportion e.g. 0.5 to 5% by weight of the copolymer of an ethylenically unsaturated monocarboxylic acid or polycarboxylic acid or a partial ester of a monoethylenically unsaturated polycarboxylic acid. Examples of such acids are acrylic and methacrylic acids, maleic acid, fumaric acid, itaconic acid, aconitic acid, citraconic acid and mesaconic acid. The presence of such acidic monomers in these copolymers has a beneficial effect on the adhesion of the copolymer to the base film; in general, the use of higher proportions than 5% has an undesirable effect on the heat stability of the product.

Other heat-sealable polymer coatings which may be applied as dispersions are polyvinyl acetate, partially hydrolysed polyvinyl acetate, butadiene/acrylonitrile copolymers, butadiene/styrene copolymers, butadiene/methyl methacrylate copolymers, butadiene/methyl methacrylate/styrene copolymers, methyl methacrylate/methacrylic acid copolymers, copolyesters of terephthalic acid and another dicarboxylic acid with a glycol, e.g. those containing no more than 4.0 molecular proportions of combined terephthalic acid to one molecular proportion of combined sebacic acid: copolymers of vinylidene chloride and vinyl chloride, or with methyl or ethyl acrylate, copolymers of vinyl acetate with ethylene or with vinyl propionate and copolymers of vinyl chloride with ethylene, or with vinyl acetate.

It will be appreciated that the concentration and particle size of the polymer in the heat-sealable coating dispersion will be chosen so that a continuous heat-sealable layer is formed. Normally a concentration of at least 20% would be used.

The coating may be applied by any suitable technique such as by roller-coating, spraying, doctor-knife coating or air-knife coating and the coating may be dried off at any temperature above 50° C. Preferred drying temperatures are from 100 to 140° C.

The coating dispersion may contain other additives, for instance, antioxidants, dyes, pigments, lubricants, anti-blocking agents and ultra violet light stabilisers. Preferably, in order to maintain the clarity of the film and impart good anti-static properties thereto, it is desirable to incorporate in the coating composition from 10–1000% by weight of the inorganic salt of a water soluble cellulose ether such as methyl cellulose, hydroxyethyl cellulose and hydroxypropyl methyl cellulose. Hydroxyalkyl celluloses are particularly preferred. It is also useful to add slip agents, i.e. comminuted solids which are insoluble in the heat-sealable coating for instance, starch, talc, zinc oxide, calcium carbanate, magnesium carbonate, diatomaceous earths such as "Superfloss," silica, kaolin, titanium dioxide, triferric tetroxide and other inorganic oxides, carbonates, silicates, aluminates and alumino-silicates and finely dispersed polymers such as polypropylene and polyvinyl chloride, the particle size of the slip agent being normally in the range 0.1–20 microns, and preferably for best effect in the range 0.2–5 microns. It is also preferable to include an anti-blocking agent which melts at a temperature above the maximum temperature likely to be encountered during storage of the coated film and which is insoluble in the coating, for instance natural waxes, paraffin wax, microcrystalline waxes, beeswax, carnauba wax, montan wax and synthetic waxes such as hydrogenated castor oil, chlorinated hydrocarbon waxes, long chain fatty acid amides etc.

The coated films used in this invention may be unoriented or may be oriented in one or both directions in the plane of the film and if oriented in both directions the orientation may be equal in these directions, or unequal with the higher degree of orientation in a preferred direction (usually the longitudinal direction). The oriented films may be heat set either before or after the coating treatment.

The films of this invention whether oriented by stretching in one or both directions or not may be used for most of the applications for which polythene, cellulose ester or polyethylene terephthalate films have been used in thickness between 0.00025 inch and 0.01 inch, for instance as packaging films.

Our invention is illustrated by the following examples in which all parts are expressed as parts by weight.

The copolymer dispersions used in all the Examples were made by an emulsifier-free aqueous dispersion polymerisation process using an ammonium persulphate/sodium metabisulphite catalyst system.

EXAMPLE 1

A 0.0005 inch thick, biaxially drawn, heat set film of isotactic polypropylene was subjected to corona discharge treatment so as to reduce its contact angle with water from 90° to 70°. It was then coated with gravure rolls with a dispersion of the following composition:

|  | Parts |
|---|---|
| Terpolymer of vinylidene chloride/acrylonitrile/ monobutyl itaconate (91:9:2) | 50 |
| Water | 50 |
| Magnesium chloride | 1 |
| Homogenised carnauba wax | 1 |
| Polyoxyethylated cetyl alcohol | 0.5 |

The coated film was dried at 100° C. to produce a clear coating $1 \times 10^{-4}$ inch thick.

EXAMPLE 2

The procedure outlined in Example 1 was repeated, the only difference being that a dispersion of the following composition was used instead of that used in Example 1:

|  | Parts |
|---|---|
| Terpolymer of vinylidene chloride/acrylonitrile/ acrylic acid (90:10:2) | 50 |
| Water | 50 |
| Magnesium chloride | 1 |
| Homogenised carnauba wax | 1 |
| Polyoxyethylated octyl cresol | 0.5 |

EXAMPLE 3

The same procedure as above was followed except that the following coating dispersion was used:

|  | Parts |
|---|---|
| Terpolymer of vinylidene chloride/acrylonitrile/ acrylic acid (91:9:2) | 50 |
| Water | 50 |
| Zinc chloride | 1 |
| Homogenised carnauba wax | 1 |
| Polyoxyethylated octyl cresol | 1 |

EXAMPLE 4

The same procedure as above was followed except that the following coating dispersion was used:

|  | Parts |
|---|---|
| Terpolymer of vinylidene chloride/acrylonitrile/ acrylic acid (91:9:2) | 50 |
| Water | 50 |
| Sodium iodide | 1 |
| Homogenised carnauba wax | 1 |
| Polyoxyethylated octyl cresol | 1 |

EXAMPLE 5

The same procedure as above was followed except that the coating dispersion comprised:

|  | Parts |
|---|---|
| Terpolymer of vinylidene chloride/acrylonitrile/ acrylic acid (91:9:2) | 50 |
| Water | 50 |
| Magnesium iodide | 1 |
| Homogenised carnauba wax | 1 |
| Polyoxyethylated octyl cresol | 1 |

EXAMPLE 6

The same procedure as above was followed except that the coating dispersion comprised:

|  | Parts |
|---|---|
| Terpolymer of vinylidene chloride/acrylonitrile/ acrylic acid (90:10:2) | 50 |
| Water | 50 |
| Magnesium chloride | 0.5 |
| Hydroxyethyl cellulose | 0.5 |
| Homogenised carnauba wax | 1 |
| Polyoxyethylated octyl cresol | 0.5 |

EXAMPLE 7

The same procedure as above was followed except that the coating dispersion comprised:

|  | Parts |
|---|---|
| Terpolymer of vinylidene chloride/acrylonitrile/ acrylic acid (91:9:2) | 50 |
| Water | 50 |
| Magnesium chloride | 0.75 |
| Hydroxyethyl cellulose | 0.25 |
| Homogenised carnauba wax | 1 |
| Polyoxyethylated octyl cresol | 0.5 |

The properties of the coated films obtained according to the above examples are set out in the table below.

| Example: | Heat seal strength,[a] g./in. | Blocking value [b] at 38° C., g. | Surface resistivity at 50% R.H., ohm cm./cm. |
|---|---|---|---|
| 1 | 155 | 45 | $5 \times 10^{10}$ |
| 2 | 185 | 28 | $3 \times 10^{10}$ |
| 3 | 175 | 30 | $9 \times 10^{10}$ |
| 4 | 175 | 30 | $5 \times 10^{11}$ |
| 5 | 180 | 105 | $8 \times 10^{10}$ |
| 6 | 180 | 110 | $5 \times 10^{11}$ |
| 7 | 165 | 65 | $9 \times 10^{9}$ |

[a] The heat seals were made at 130° C./5 p.s.i. for 2 seconds with a "Sentinel" heat sealer one inch wide by 12 inches long.
[b] Blocking value was determined in the following manner: Two layers of the coated film were superimposed under a load of ¼ p.s.i. for 20 hours at 38° C. One layer was attached to one of a pair of rectangular parallel plates 4″ x 3″, the other layer being attached to the second plate. The plates were slowly drawn apart in such a way as to allow the layers to peel away from one another symmetrically from two opposite edges of the plates. The maximum force just before separation was measured.

It will be appreciated that the invention may also be applied to polyethylene terephthalate and similar polyester films.

What is claimed is:

1. A heat-sealable anti-static film consisting of a substrate of oriented polyolefin having a coating thereon, said coating consisting essentially of at least one heat-sealable polymer and at least one salt of a member selected from the group consisting of ammonium and the metals of Groups I, II, II–A and III–A and the transition metals of the Periodic Table, said salt being stable at temperatures above 50° C. and having a solubility of at least 25% by weight in water at 20° C., the amount of said salt being sufficient to improve the anti-static properties of the coating composition.

2. The film of claim 1 where the said salt is selected from the group consisting of ammonium iodide, lithium iodide, sodium iodide, potassium iodide, lithium bromide, lithium chloride, magnesium iodide, magnesium chloride, calcium chloride, zinc chloride, chromic chloride, sodium fluoride, potassium fluoride, magnesium nitrate, nickel nitrate, cobalt nitrate, aluminum sulphate and manganese sulphate.

3. The film of claim 1 wherein the said heat-sealable polymer is selected from the group consisting of polyvinyl acetate, partially hydrolyzed polyvinyl acetate, butadiene/acrylonitrile copolymers, butadiene/styrene copolymers, butadiene/methyl methacrylate copolymers, butadiene/methyl methacrylate/styrene copolymers, methyl methacrylate/methacrylic acid copolymers, copolyesters of terephthalic acid and another dicarboxylic acid with a glycol, copolymers of vinylidene chloride and vinyl chloride, or with methyl or ethyl acrylate, copolymers of vinyl acetate with ethylene or with vinyl propionate and copolymers of vinyl chloride with ethylene, or with vinyl acetate.

4. A film according to claim 1 in which the ammonium salt is an ammonium halide.

5. A film according to claim 1 in which the salt is a halide of a metal classified in Groups I and II and as Transition Metals of the Periodic Table.

6. A film according to claim 1 in which the salt is selected from a nitrate and sulphate of a metal classified in Groups II–A and III–A of the Periodic Table.

7. A film according to claim 1 in which the coating contains a non-ionic surface active agent which is a condensation product of ethylene oxide with a fatty acid or a fatty acid amide.

8. A film according to claim 1 in which the substrate surface is activated to improve the adhesion of coating thereto before the application of the coating.

9. A film according to claim 1 in which the heat-sealable polymer is a copolymer of vinylidene chloride in a major amount with another copolymerizable monoethylenically unsaturated monomer.

10. The film of claim 9 wherein the said monomer is selected from the group consisting of methyl acrylate, ethyl acrylate, methyl methacrylate, methacrylamide, methyl vinyl ether, ethyl vinyl ether, methyl vinyl ketone and acrylonitrile.

11. A film according to claim 1 in which the heat-sealable polymer is a terpolymer of vinylidene chloride, a copolymerizable monoethylenically unsaturated monomer and up to 5% by weight based on the weight of the vinylidene chloride and the copolymerizable monoethylenically unsaturated monomer of an ethylenically unsaturated carboxylic acid.

12. A film according to claim 11 in which the ethylenically unsaturated carboxylic acid is a partial ester of a monoethylenically unsaturated polycarboxylic acid.

13. The film of claim 11 wherein the said carboxylic acid is selected from the group consisting of acrylic and methacrylic acids, maleic acid, fumaric acid, itaconic acid, aconitic acid, citraconic acid and mesaconic acid.

14. A film according to claim 1 in which the coating additionally contains a water-soluble cellulose.

15. A film according to claim 14 in which the water-soluble cellulose is hydroxyethyl cellulose.

16. A film according to claim 1 in which the coating contains a slip agent that is a comminuted solid which is insoluble in the heat-sealable coating.

17. A film according to claim 1 in which the polyolefin is selected from the group consisting of polypropylene and polyethylene.

18. A film according to claim 1 in which the substrate is oriented in both directions.

19. A film according to claim 1 in which the substrate is heat-set.

References Cited

UNITED STATES PATENTS

| 2,086,590 | 7/1937 | Whitehead | 117—139.5 X |
| 3,262,808 | 7/1966 | Crooks et al. | 117—122 X |

WILLIAM D. MARTIN, Primary Examiner

J. E. MILLER, Assistant Examiner

U.S. Cl. X.R.

117—47, 138.8, 161; 161—256